(12) United States Patent
Underhill

(10) Patent No.: US 6,170,245 B1
(45) Date of Patent: Jan. 9, 2001

(54) ROUND BALE FORMING ROLL

(75) Inventor: Kenneth R. Underhill, Strasburg, PA (US)

(73) Assignee: New Holland North America, Inc., New Holland, PA (US)

( * ) Notice: Under 35 U.S.C. 154(b), the term of this patent shall be extended for 0 days.

(21) Appl. No.: 09/306,087

(22) Filed: May 6, 1999

Related U.S. Application Data

(60) Provisional application No. 60/084,867, filed on May 8, 1998.

(51) Int. Cl.$^7$ .................................................. A01D 39/00
(52) U.S. Cl. ................................................ 56/341; 100/88
(58) Field of Search ...................... 56/371, 373; 100/88, 100/89

(56) References Cited

U.S. PATENT DOCUMENTS

| | | | |
|---|---|---|---|
| 4,182,101 | * | 1/1980 | Gaeddert et al. ................ 56/341 |
| 4,782,652 | * | 11/1988 | White ................................ 56/341 |
| 4,870,812 | | 10/1989 | Jennings et al. .................. 56/341 |
| 5,097,760 | * | 3/1992 | Ratzlaff et al. ................... 56/341 |
| 5,444,969 | | 8/1995 | Wagstaff et al. .................. 56/341 |
| 5,913,805 | * | 6/1999 | Vodon ............................... 56/341 |

* cited by examiner

Primary Examiner—Thomas B. Will
Assistant Examiner—Nathan Mammen
(74) Attorney, Agent, or Firm—J. William Stader; Larry W. Miller

(57) ABSTRACT

A round baler for forming crop material into cylindrical bales. The baler has a main frame, a pair of side walls, a crop pickup mounted on the main frame, and a tailgate pivotally connected to the main frame. The tailgate is operative between a closed position during which a bale is being formed in an expandable chamber, and an open position during which a formed bale is being discharged from the chamber. A sledge assembly, pivotally mounted on the main frame for movement between a bale starting position and a full bale position, has crop engaging transverse rolls for urging the crop material along a spiral path in the chamber for starting and forming a bale. A apron is supported along a continuous path on the main frame and tailgate by a plurality of rotatable guide members. The path has an inner course that cooperates with the sledge rolls on the sledge assembly to define moveable walls of the chamber. A drive roll moves the apron along the continuous path. One of the transverse rolls on the sledge has a plurality of flaps that extend into the space between and has intermittent contact with the apron as it travels in the vicinity of the outer surface of the transverse roll. This prevents leakage of stray crop material from the space between such roll and the apron under conditions where a cylindrical package of crop material is being formed in the chamber.

6 Claims, 5 Drawing Sheets

ROUND BALE FORMING ROLL

CROSS REFERENCE TO RELATED APPLICATION

This application claims the benefit of U.S. Provisional Application No. 60/084,867, filed May 8, 1998, and entitled "Round Bale Forming Apparatus".

FIELD OF THE INVENTION

The present invention relates to agricultural apparatus for forming and wrapping cylindrical packages of crop material, generally referred to as round balers, and more particularly to a round baler in which a package of crop material is formed in a generally cylindrically shaped forming chamber, defined, at least in part, by one or more transverse rolls.

BACKGROUND OF THE INVENTION

Round balers generally have a bale forming chamber defined by a pair of opposing side walls associated with an array of side-by-side belts, transverse slats trained on chains, a plurality of transverse rolls or a combination of these various elements, e.g., rolls and belts. During field operation, windowed crop material such as hay is picked up from the ground and fed in a continuous stream into a fixed or variable diameter chamber. The hay is rolled into a cylindrical package within the chamber, wrapped with twine, net or the like and ejected onto the ground for subsequent handling.

U.S. Pat. No. 5,444,969, issued Aug. 29, 1995 in the name of Robert A. Wagstaff, et al, discloses a prior art round baler of the general nature described above. In this particular type of baler an expandable chamber is defined by a pair of fixed sidewalls, and a plurality of side-by-side belts cooperating with a series of transverse rolls, mounted between a pair of pivotally mounted arms. This arrangement of rolls and arms is commonly referred to as a sledge assembly. In the vicinity of the chamber where the belts and rolls operate in close proximity the transverse roll closest to the belts strips material from the adjacent belts that are trained about what is referred to as a follower roll. This is a common expedient in prior art balers having a chamber defined by rolls and belts.

The chamber includes an inlet opening in the front through which crop material is fed. Also included is a pair of take up arms pivotally mounted on the main frame, between which arms a pair of guide rolls are journalled. A biasing force on the take up arms urges the outer surfaces of the guide rolls against the belts to maintain tension and thereby prevent slack from occurring in the belts during expansion and contraction of the chamber. Density of the bale can be affected by varying the force on the take up arms.

The present invention relates to an improved round baler in which a cylindrical package of crop material is formed in a chamber comprising fixed side walls and expandable transverse elements consisting of a combination of belts and rolls of the general nature described in the preceding paragraph. The '969 patent, cited above, is an example of many prior art patents, assigned to New Holland North America, Inc., that disclose this type of round baler. It is not uncommon in prior art round balers having this general configuration for small amounts of crop material from the outer surface of the cylindrical package in the chamber to have a tenancy to be carried by the belts around the follower roll and through the space between the stripper roll and the belts that are trained about the follower roll. One function of the stripper roll is to combat these losses. The top peripheral surface of the stripper roll is moving toward the bale chamber and in a direction opposite to the direction of the belts on the follower roll. This serves to urge back into the chamber stray crop carried away from the chamber by the belts. This stripping function has met with a varying degree of success due to the need to maintain a predetermined distance between the belts and stripper roll to accommodate slugs of randomly accumulated debris between the belts and follower roll. Frequency and size of these slugs of material varies depending on type of crop being baled and general operating conditions, e.g., amount of humidity, temperature, etc. One type of crop material that has been particularly troublesome is plants with longs stems. Thus some losses occur as material passes through the space, regardless of the stripping function of the stripper roll. If the space between the stripper roll and belts is reduced to overcome this leakage problem, then the occurrence of occasional slugs leads to other problems, not the least of which is poor belt tracking, binding, and even eventual belt deterioration. Serious consequences are also encountered when crop debris leaks into the wrapping area and interferes with the starting and cutting functions of the wrapping apparatus.

Unique characteristics of the present invention, described below, contribute to a round baler with reduced losses that, among other things, has improved efficiency and enhanced performance and durability.

SUMMARY OF THE INVENTION

Accordingly, one object of the present invention is to provide a round baler that overcomes the above discussed problems.

Another object of the present invention is to provide a round baler with a stripper roll for preventing leakage of crop material from the bale forming chamber.

Still another object of the present invention is to provide a round baler with a stripper roll for preventing leakage of crop material from the bale forming chamber regardless of the intermittent presence of slugs of unwanted material between an adjacent follower roll and the apron belts trained on such follower roll.

Yet another object of the present invention is to provide a round baler with a stripper roll that operates adjacent the path of continuous belts to reduce crop losses during formation of a bale.

Still another object of the present invention is to provide in a round baler a transverse bale forming roll that strips crop material from belts trained about an adjacent roll regardless of the presence of random slugs of material that pass between the belts and such adjacent roll.

In pursuance of these and other important objects the present invention contemplates improvements to a round baler for forming crop material into cylindrical bales. The baler comprises a main frame, a tailgate pivotally connected to the main frame, operative between a closed position during which a bale is being formed, and an open position during which a formed bale is being discharged. The baler further comprises a bale forming assembly mounted on the main frame and the tailgate. The bale forming assembly includes conveying means having a crop engaging surface extending transversely of the main frame and an apron supported along a continuous path on the main frame and on the tailgate by a plurality of rotatable guide members. The apron path has an inner course that cooperates with the conveying means on the bale forming assembly to define a bale forming chamber. Drive means operatively engage the apron to move it along the continuous path, and a forwardly mounted pickup feeds crop material into the chamber. More particularly, the invention contemplates a baler in which the conveying means on the bale forming assembly comprises a transverse stripper roll having a generally cylindrical outer surface. Resilient means extend from the transverse roll for intermittent contact with the apron under conditions where a cylindrical package of crop material is being formed in the chamber, preventing leakage of stray crop material from the chamber via the space between the stripper roll and the apron.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
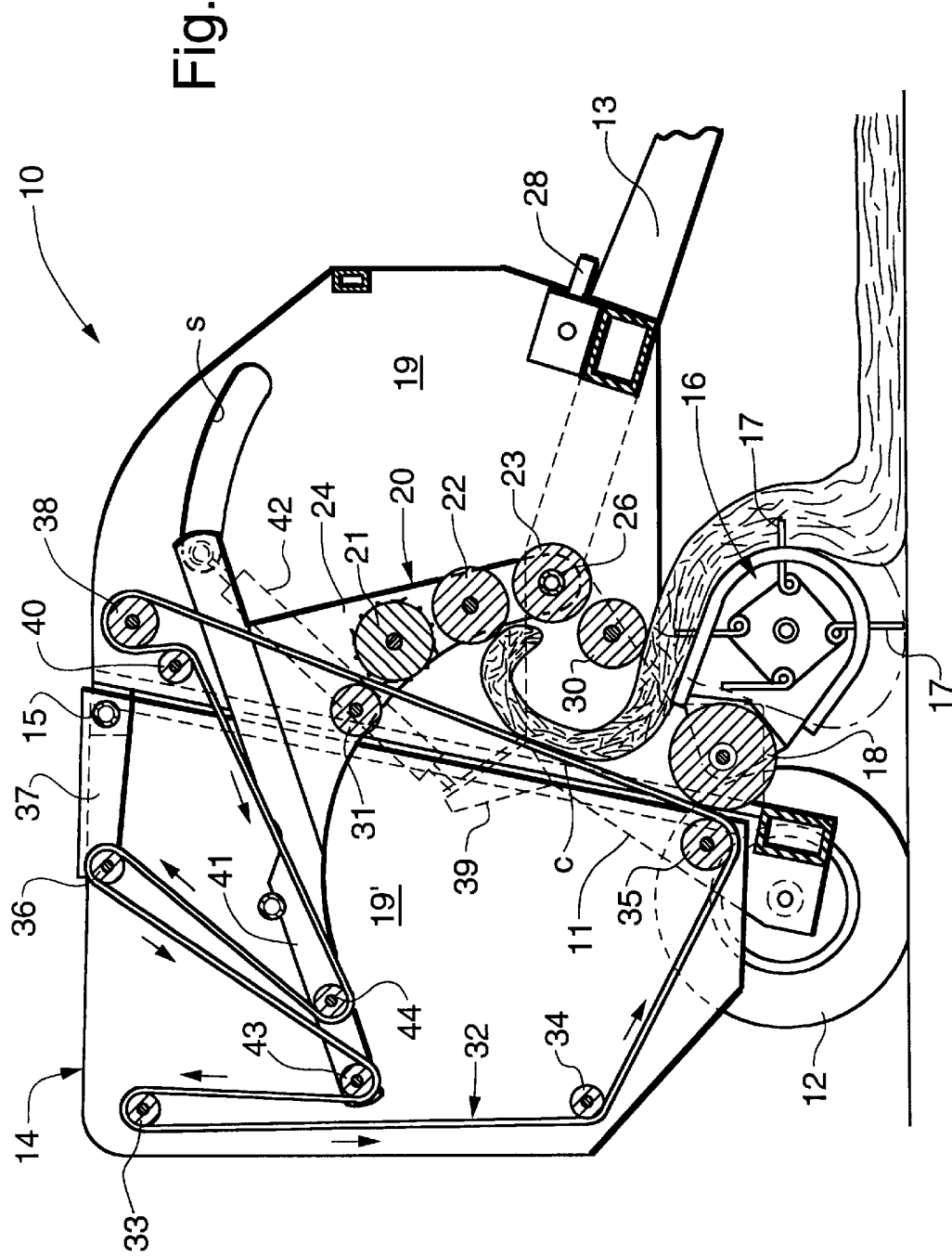
FIG. 1 is a cross sectional diagrammatic side elevational view of a round baler in which the present invention is incorporated. The tailgate is in the closed position and the elements of the bale forming chamber are shown in their core starting condition.

Referring to the drawings for a detailed description of the preferred embodiment of the invention, FIG. 1 shows the cross section of a round baler 10 of the type in which the present invention is readily embodied. Baler 10 has an expandable bale forming chamber defined in part by belts and rolls. This type of expandable chamber is disclosed in various prior art patents, e.g., U.S. Pat. No. 5,444,969 mentioned above, and earlier U.S. Pat. No. 4,870,812, issued Oct. 12, 1989 in the name of Richard E. Jennings, et al, both of which are hereby incorporated by reference. It should be noted that throughout this description the drawings are diagrammatic in nature to best show the elements of the baler in which the invention is embodied. To this end, in many instances only one element in a pair is shown, especially in those cases where identical elements exist, disposed on opposing sides of the baler, e.g., wheels.

Baler 10 has a main frame 11, comprising a plurality of rigid structural elements including a pair of side walls 19 (only one shown). Main frame 11 is supported by a pair of wheels 12 (also only one shown). A forwardly mounted tongue 13, integral with main frame 11, provides for connection to a tractor. Pivotally connected to side walls 19 by a pair of stub shafts 15 (only one shown) is a tailgate 14 which is closed during bale formation. Tailgate 14 includes walls 19' coplanar with side walls 19. A pickup 16, mounted on main frame 11, has a plurality of tines 17, the tips of which are movable along a predetermined path to lift crop material from the ground and deliver it rearwardly along a generally horizontal path toward a floor roll 18, rotatably mounted on main frame 11.

An expandable chamber for forming bales is defined by side walls 19', 19, belts, and a sledge assembly 20, operative between the inwardly facing surfaces of such walls. Sledge assembly 20 comprises a plurality of transversely extending rolls 21, 22, 23 journalled at their ends in a pair of spaced apart arms 24, one of which is shown. These arms are pivotally mounted on stub shafts 26 for providing movement of sledge assembly 20 from the bale starting position shown in FIG. 1 through the partly full position shown in FIG. 2 to the full bale position shown in FIG. 3, and finally to the bale discharge position shown in FIG. 4. Rolls 21, 22, 23 are driven in a counter-clockwise direction by conventional means (for example, chains and sprockets) coupled via an appropriate drive train to a drive shaft 28. A starter roll 30, located adjacent roll 23, is also driven counter-clockwise. Sledge assembly 20 includes a forth roll, a freely rotatable idler roll 31 carried between arms 24, commonly referred to as a follower roll.

The bale forming chamber is further defined by an apron 32 comprising a plurality of laterally spaced side-by-side belts supported by guide rolls 33, 34, 35, rotatably mounted in tailgate 14, and roll 36, rotatably mounted on stationary arms 37, affixed to main frame 11. Apron 32 is also supported on a drive roll 38, mounted on main frame 11. Although apron 32 passes between roll 21 and follower roll 31, it is in engagement only with follower roll 31 and not roll 21. In addition to its bale forming function, roll 21 also serves to strip crop material from the belts. Roll 21, referred to as a stripper roll, has a configuration shown generally in FIGS. 1–4. This configuration, which is at the heart of the present invention, is shown in detail in FIG. 5, discussed below.

Suitable coupling means (not shown) connected to drive shaft 28 provide for rotation of drive roll 38. This causes movement of apron 32 along its varying paths in the directions indicated by the arrows in FIGS. 1, 2 and 3. An additional guide roll 40 in the main frame 11 ensures proper driving engagement between the surfaces of the belts of apron 32 and the surface of drive roll 38.

A pair of take up arms 41 (only one shown), integral with sledge assembly 20, are affixed to sledge arms 24 for movement between inner, intermediate, outer and bale discharge positions shown in FIGS. 1, 2, 3 and 4, respectively. Take up arms 41, which carry additional guide rolls 43, 44 for supporting apron 32, are urged with sledge assembly 20 toward the innermost position (FIG. 1), i.e., bale starting position, by tension spring 42, mounted between one of arms 41 and main frame 11 by bracket assembly 39, affixed to main frame 11. Spring 42, mounted outwardly from wall 19, is pivotally secured to arm 41 by journal means extending through access slot s in side wall 19.

While one function of spring 42 is to return the sledge and takeup assemblies to the start position after a bale is discharged, another equally as important function is to provide a force on sledge assembly 20 that resists expansive forces on the chamber.

When the elements of round baler 10 are disposed as shown in FIG. 1, an inner course c of apron 32 extends between guide roll 35 and idler roll 31 to form the rear wall of the core starting chamber while the inwardly facing peripheral surfaces of rolls 21, 22, 23 define in a general manner a rearwardly inclined cooperating front wall. Floor roll 18 defines the bottom of the chamber and with starter roller 30 provides an inlet for crop material.

Figure 2:
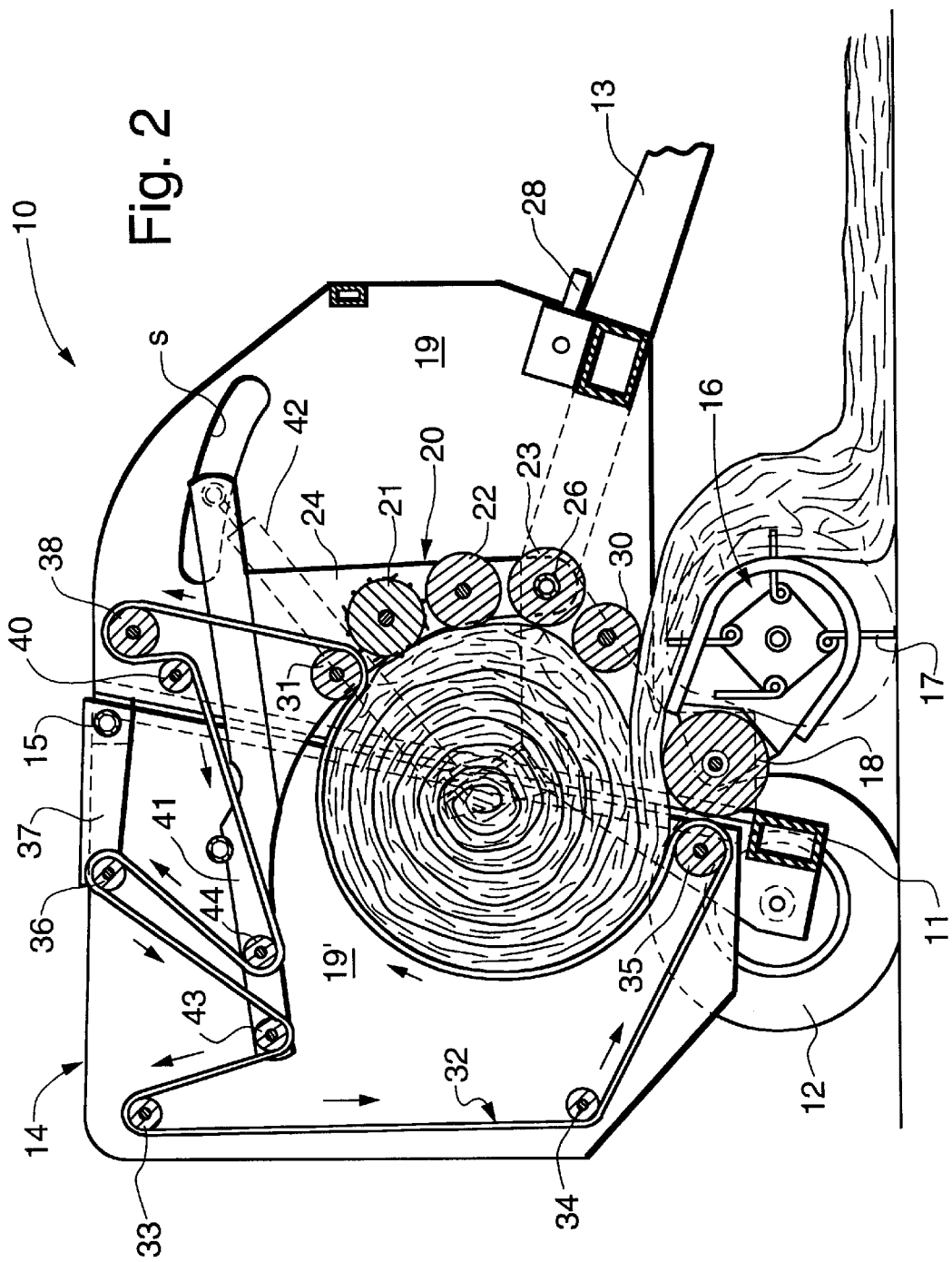
FIG. 2, generally similar to FIG. 1, is a cross sectional diagrammatic side elevational view of a round baler in which the tailgate is in the closed position and the elements of the bale forming chamber are shown in an intermediate bale forming condition.

When round baler 10 travels across a field, pickup tines 17 lift crop material from the ground and deliver it through the inlet. The crop material is carried rearwardly by floor roll 18 into engagement with apron inner course c (FIG. 1) which urges it upwardly and forwardly into engagement with the rolls on sledge 20. In this manner crop material is coiled in a clockwise direction to start a bale core. Continued feeding by pickup tines 17 of crop material into the bale forming chamber in a generally spiral fashion causes the apron inner course c to expand in length around a portion of the circumference of the cylindrical package of crop material as its diameter increases (FIG. 2). Take up arms 41 rotate with sledge assembly 20 about the coaxial horizontal axes of stub shafts 26 from their initial positions shown in FIG. 1 toward their outer positions shown in FIG. 3 to provide for expansion of the inner course of the apron in a manner similar to that of the prior art balers mentioned above, i.e., in effect the outer course of the belts of apron 32 is diminished in length while the inner course increases a like amount. After a cylindrical package of crop material has been formed in the fashion described and wrapped with twine or net in a well known manner to form a bale, tailgate 14 is opened and the bale is ejected rearwardly as shown in FIG. 4. Subsequent closing of tailgate 14 returns the inner and outer courses of the belts of apron 32 to the locations shown in FIG. 1.

Figure 3:
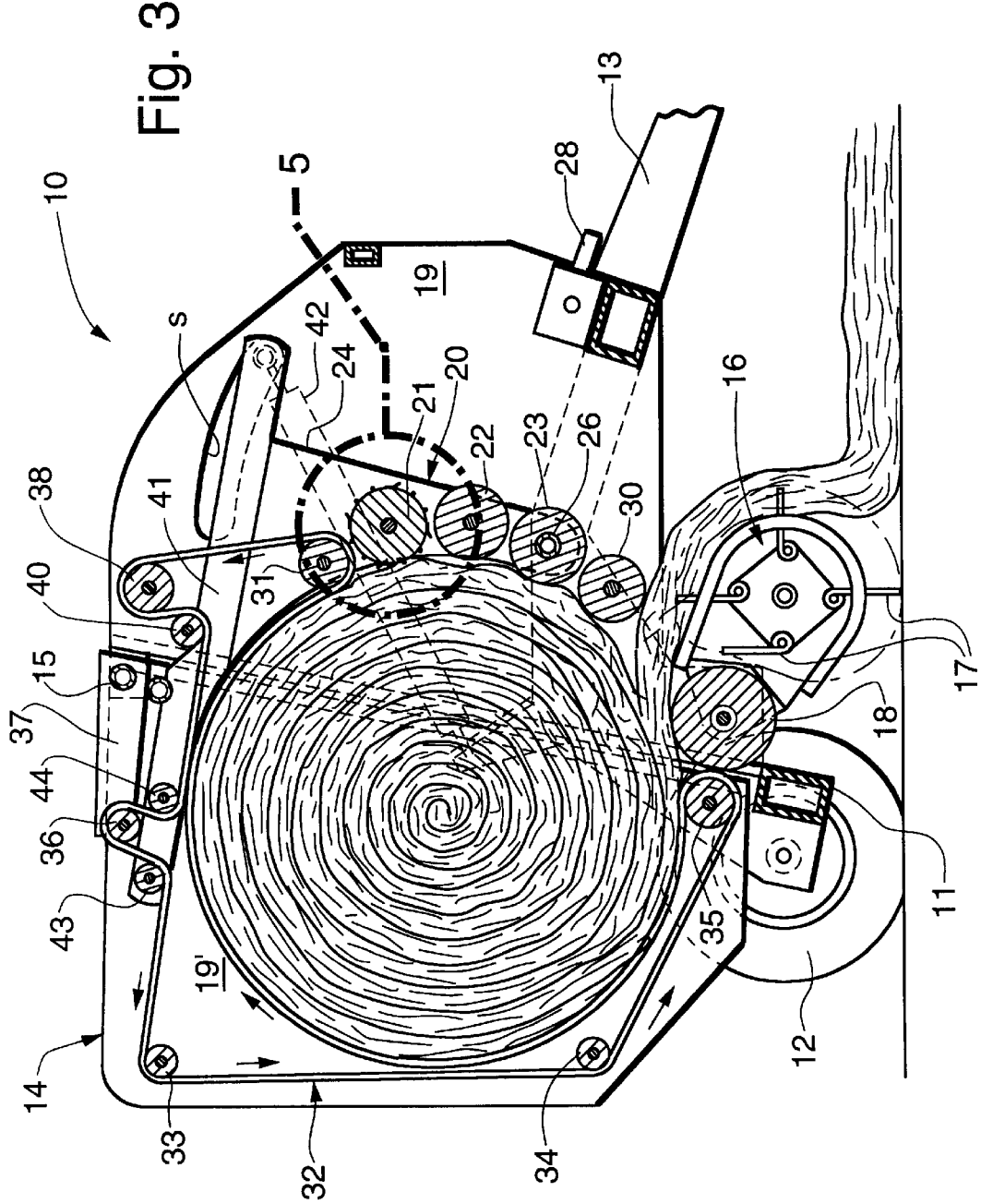
FIG. 3, also generally similar to FIG. 1, is a cross sectional diagrammatic side elevational view of a round baler in which the tailgate is in the closed position and the elements of the bale forming chamber are shown in the full bale condition.
Figure 4:
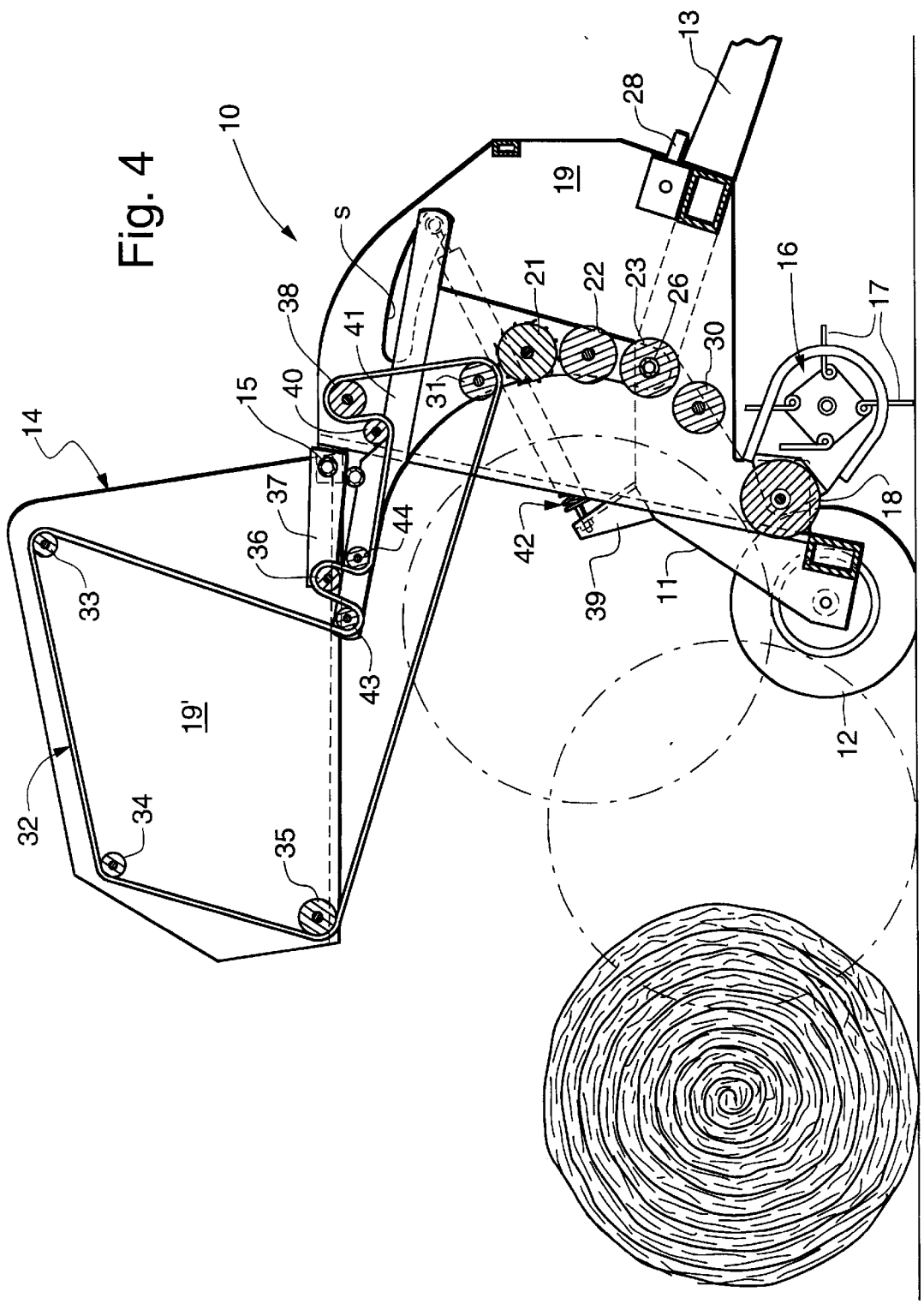
FIG. 4, also a cross sectional diagrammatic side elevational view of a round baler, shows the tailgate in the open position and the elements of the bale forming chamber after a bale has been discharged.

During bale formation, sledge assembly 20, along with the above described integral take up assembly, moves between a bale starting position (FIG. 1) to a full bale position (FIG. 3). This movement of sledge assembly 20 causes idler roll 31 to move along a generally arcuate path while maintaining apron 32 in close proximity to roll 21, thereby allowing roll 21 to strip crop material from the belts and prevent or reduce significantly the loss of crop material through the space between roll 21 and apron 32 during formation of a bale. Sledge assembly 20 is pushed outwardly towards its full bale position during bale formation as the crop material expands against rolls 21, 22, 23 and then subsequently is returned inwardly by apron 32 and spring 42 to the position shown in FIG. 1.

With the above description and general operation of baler 10 as a background, attention will now be directed to important features of the present invention. As will become apparent, baler 10 is merely illustrative of one of the many round baler configurations to which the features of the present invention are adaptable. For example, varying the number of rolls on the sledge assembly or altering the pivot location on the sledge assembly would have no affect on the general aspects of the present invention.

To further enhance understanding of the various features of the present invention, it should be noted that even though a unified sledge and take up assembly is shown the invention is equally adaptable to other types of round baler configurations having stripper rolls operative in the vicinity of a continuous belt, e.g., a round baler in which the take up arms and sledge are not integral. Thus, the many advantages realized by the present invention are not limited to a round baler with a particular configuration.

In the preferred embodiment of the present invention contemplates a sledge assembly 20 of the type shown in FIGS. 1–4. Sledge 20 consists of conveying means comprising rolls 21, 22, 23 for engaging the periphery of the cylindrical package of crop material during the bale forming operation described above, and roll 31 about which apron 32 is trained. As mentioned above, roll 21 is commonly referred to as a stripper roll 21 and roll 31 is commonly referred to as a follower roll.

Figure 5:
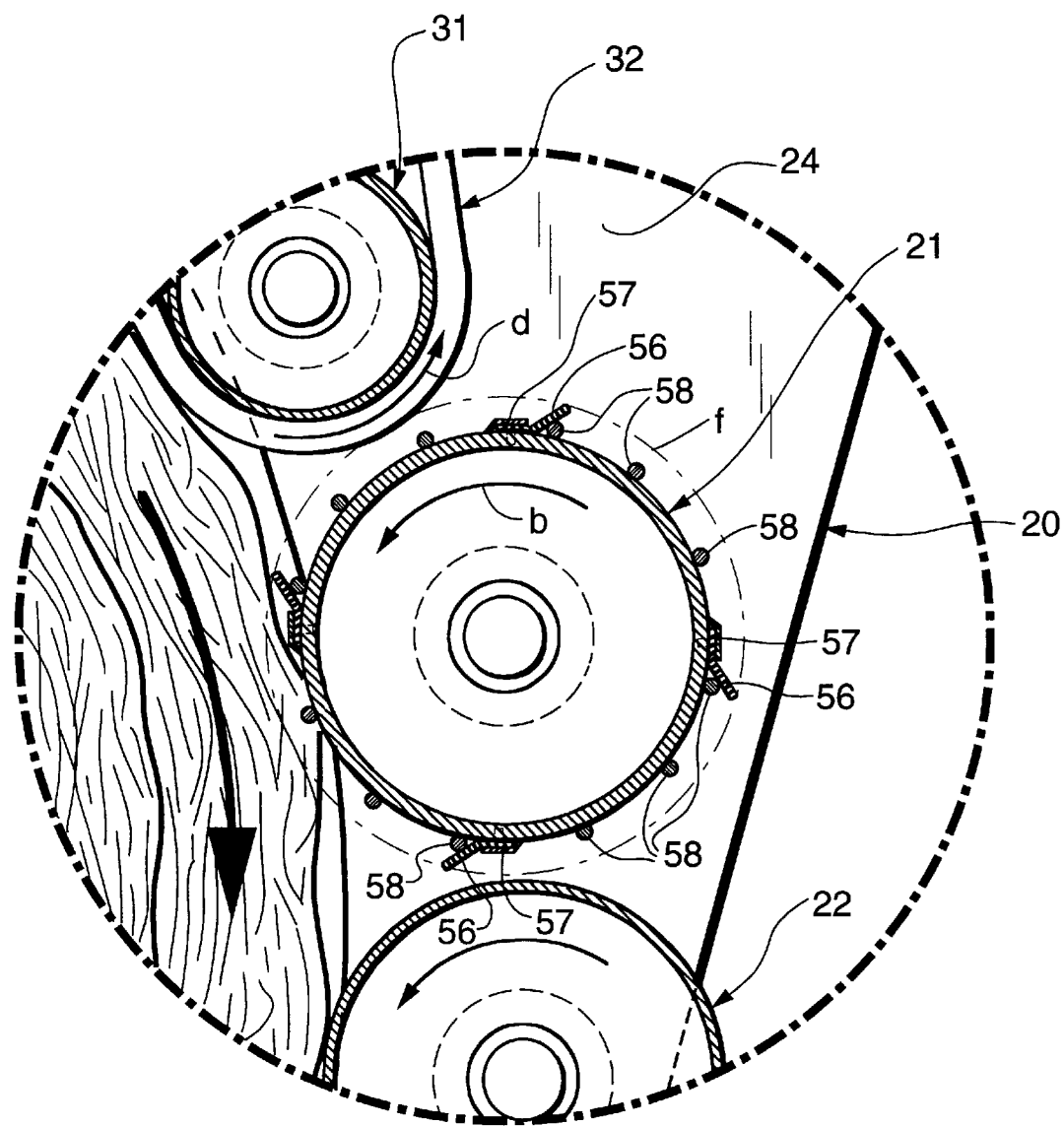
FIG. 5 is a view showing in detail those elements shown in within circle "5" in FIG. 3.

Now turning to FIG. 5, stripper roll 21 driven in direction b, is mounted with its outer surface spaced from the continuous path of apron 32, being driven in direction d, which is in opposition to direction b. This strips stray crop material from the apron and urges it back into the bale forming chamber for consolidation with the cylindrical package of crop material being formed. This general stripper function, accomplished by virtue of the outer surface of the stripper roll being moved in a direction opposite to the direction of travel of the apron, is known in the prior art.

It should be noted that because it is standard practice to space the side-by-side belts of a round baler apron, some stray crop material may in some instances be separated from the surface of the cylindrical package during formation and find its way to the space between the belts and be conveyed between the follower roll and the inside surface of the belts.

Thus, it is desirable that a certain minimum space be maintained to avoid contact between the two surfaces rotating in opposite directions, under conditions where a slug of material finds its way to the nip between follower roll 31 and the interior surface of the belts and apron 32. This slug will pass through and merely cause the apron belt to bulge at that point, which bulge is accommodated by the above mentioned predetermined gap. In the past, leakage of crop material has been experienced through this gap.

The present invention obviates this problem. Resilient means extend from stripper roll 21 for intermittent contact with apron 32 along path f under operative conditions. More specifically, a plurality of rubber flaps 56 are secured to the surface of stripper roll 21 by a like plurality of hold down clips 57. Also secured to the stripper roll are a series of parallel transverse rods 58, some of which also serve to maintain the upwardly angled position of flaps 56. Thus, when a cylindrical package of crop material is being formed in the chamber the flaps prevent leakage of crop material from the chamber via the gap between stripper roll 21 and the outer surface of apron 32, but are forgiving to slugs of material, due to their resiliency. To enhance stripping as well as aggressiveness of roll 21, a plurality of rods 58 may be affixed intermittently along the outer surface of roll 21 between flaps 56. These additional rods and the spacing thereof are optional depending on the type and condition of crop material being harvested.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

What is claimed is:

1. A round baler for forming crop material into cylindrical bales, said baler having
   a main frame,
   a tailgate pivotally connected to said main frame, said tailgate operative between a closed position during which a bale is being formed, and an open position during which a formed bale is being discharged,
   a sledge assembly mounted on said main frame for pivotal movement between a bale starting position and a full bale position, said sledge assembly including conveying means mounted thereon having a crop engaging surface extending transversely of said main frame, an apron supported along a continuous path on said main frame and on said tailgate by a plurality of rotatable guide members, said apron path having an inner course that cooperates with said conveying means on said sledge assembly to define a bale forming chamber, drive means for moving said apron along said continuous path, said drive means including means operatively engagable with said apron, and a pickup for feeding crop material into said chamber, the improvement comprising said conveying means mounted on said sledge assembly comprising a transverse roll having a generally cylindrical outer surface, means for mounting said roll for movement along an arcuate path during said pivotal movement between said bale starting position and said full bale position, said roll positioned on said sledge assembly to define a space between its outer surface and a portion of said continuous path of said apron in the vicinity of said portion of said continuous path, means for rotating said roll such that the outer surface thereof moves in a direction opposite to the direction of travel of said apron, and resilient means extending from said transverse roll for intermittent contact with said apron as it travels in the vicinity of said portion of said continuous path under conditions where a cylindrical package of crop material is being formed in said chamber, whereby leakage of crop material from said bale forming chamber through said space is prevented.

2. In a round baler as set forth in claim 1 wherein said plurality of rotatable guide members include a follower roll about which said apron is trained, and said resilient means comprise a plurality of flaps extending from said roll to block said space and prevent leakage regardless of variations therein caused by slugs of crop material passing between said apron and said follower roll.

3. In a round baler as set forth in claim 2 wherein said improvement further comprises means for securing said flaps transversely along said roll.

4. In a round baler as set forth in claim 2 wherein said improvement further comprises means for holding said flaps to extend rearwardly with respect to the direction of travel of said outer surface under conditions where said roll is rotating.

5. In a round baler as set forth in claim 1 wherein said improvement further comprises auxiliary means extending from said transverse roll for intermittently contacting said stray crop material in said space.

6. In a round baler as set forth in claim 5 wherein said auxiliary means comprise a plurality of rigid crop engaging elements.

* * * * *